May 23, 1944.    J. W. WHITE    2,349,321
ACCUMULATOR
Filed Sept. 1, 1942
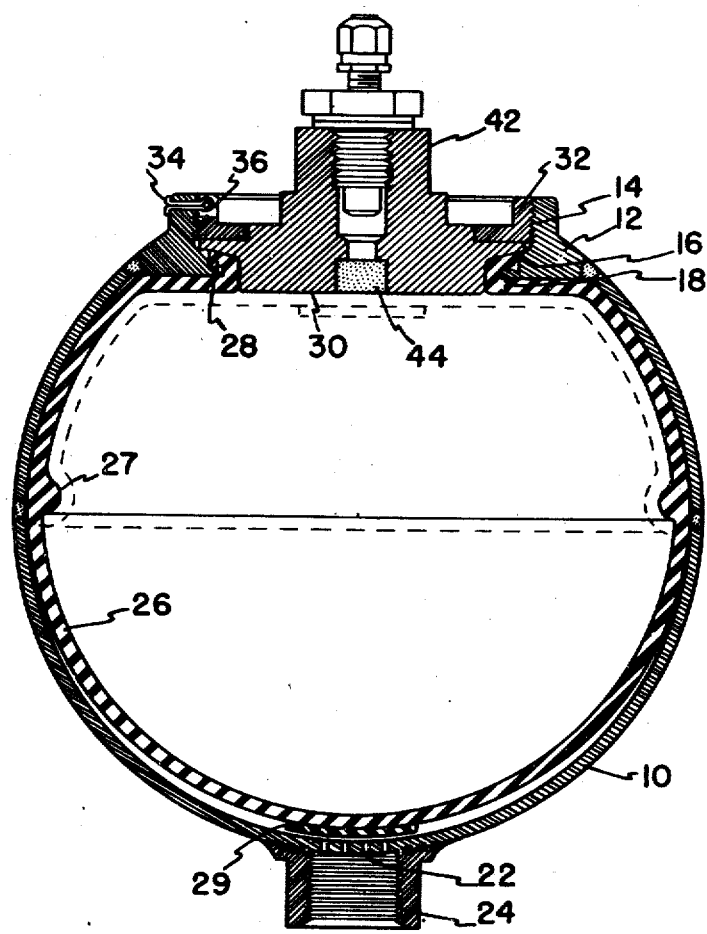
INVENTOR.
JOHN W. WHITE
BY H.W. Brelsford
ATTORNEY

UNITED STATES PATENT OFFICE 2,349,321

ACCUMULATOR

John W. White, North Hollywood, Calif., assignor, by mesne assignments, to Bendix Aviation, Ltd., North Hollywood, Calif., a corporation of California Application September 1, 1942, Serial No. 456,948

1 Claim. (Cl. 138—30)

This invention relates to accumulators, particularly of the type used on the hydraulic systems of airplanes.

An accumulator is a device for storing hydraulic fluid under pressure. This is done by providing a pressure vessel with a yielding wall. For this purpose, a pressure vessel may be used having a yielding diaphragm against which the hydraulic fluid acts, with air or other gas under compression acting on the other side of the diaphragm. The diaphragm separates air and liquid to prevent air from being dissolved in the liquid, which air might later cause trouble. Another type is an air biased accumulator of the bladder type, in which a bladder fitted inside a pressure vessel is filled with air under compression against which hydraulic fluid acts. This type of accumulator is much lighter than the diaphragm type.

Although this invention is fully applicable to a diaphragm type accumulator, or other type using compressed gas as a biasing means, it will be described with relation to a bladder type accumulator.

One of the test requirements of all air biased accumulators used in aircraft is that the partition between air and hydraulic fluid must be able to withstand full hydraulic pressure when all the air is completely expelled from the unit. This test is to insure that the accumulator will not be damaged by a faulty air valve. When all air is expelled the hydraulic pressure forces the bladder or diaphragm against the upper walls of the accumulator, and against the air inlet hole.

Since bladders and diaphragms must be flexible, they are made of oil resisting synthetic rubber, such as Neoprene. This rubber is relatively tough, but not tough enough to prevent being extruded into the air inlet hole under test conditions. The hydraulic test pressure used is about 3,000 psi for 1,000 psi hydraulic systems. For hydraulic systems of 3,000 psi this test pressure is 6,000 psi. Even if a group of fine drilled holes are used for the air inlet, this pressure is sufficient to extrude the rubber into the holes, cutting holes in the bladder or diaphragm, which completely unfits it for use.

It is therefore an object of this invention to provide an accumulator having an air inlet which will not damage diaphragms and bladders when full hydraulic pressure is applied and the air expelled.

Another object is to provide an accumulator air inlet made of sintered powdered metal.

Still another object is to cover an opening into the shell of an accumulator with a porous material that will support a bladder or diaphragm under pressure.

The drawing forming a part of this specification is an elevation view, in full section, of a bladder type accumulator embodying the invention.

Referring to the drawing, a generally spherical shell 10 has fine holes 22 drilled in the bottom thereof. A threaded fitting 24 is welded to the outside of the shell and the hydraulic system is connected to this fitting. Welded to the upper part of shell 10 is a collar 12. The collar 12 has a threaded opening 14, an internal annular shoulder 16 and an internal annular lip 18.

A bladder 26 of flexible material is fitted in shell 10. The bladder 26 has a preformed shape as shown in solid lines, with the lower half thinner than the upper half. The bladder has an internal bead 27, a patch 29 on the bottom, and has an external lip 28 which hooks over collar lip 18. A plug 30 is fitted in collar 14 which fits snugly against the upper end of the bladder and rests upon shoulder 16. An annular nut 32 is threaded within collar 12 to hold the plug 30 in place. A cotter pin 34 passes through collar 12 and fits in a slot 36 in nut 32 to lock the nut in place.

Plug 30 is centrally drilled at 40 to receive a threaded air valve unit 42. The hole 40 is enlarged at the bottom surface of plug 30 to receive an insert 44 of sintered powdered metal. The insert is composed of bronze metal sintered at just below the eutectic temperature of the alloy. The ports in the metal are less than two-thousandths of an inch and probably average about half of a thousandths of an inch. These holes are so fine that they may be considered to be an impervious wall as regards a material having the toughness of synthetic rubber at hydraulic test pressures. The air, however, has no difficulty in passing through the sintered metal.

The hydraulic outlet 24 could also be provided with a porous insert. The resistance to hydraulic fluid flow would be so great, however, that the flow characteristics would not be practical.

In operation, air under pressure is applied at valve 42 and passes through porous insert 44 into the interior of bladder 26. The pressure is built up to about 600 psi. The bladder 26 at this time is tightly pressed against the walls of shell 10, and the patch 29 of fabric material on the bottom of bladder 26 covers hydraulic holes 22. The patch 29 is sufficient to protect the bladder from extrusion through drilled holes inasmuch as the air pressure, when the bladder is fully extended, never exceeds 1000 psi on test, even on high pressure (3000 psi) hydraulic systems. This air pressure is in contract to hydraulic pressure which on test are about 3000 psi for a 1000 psi hydraulic system and higher on high pressure systems.

Fitting 24 is then connected to a hydraulic system having a pump which forces hydraulic fluid into the shell 10 against the air pressure. As the hydraulic flow increases, the lower part of bladder 26 will be pressed upwardly until the compression of the air builds up an air pressure which equals the hydraulic pressure. Thereafter the hydraulic fluid will be decreased or increased in amounts depending upon the demands of the hydraulic system and the pump supply pressure.

For testing, the air valve 42 is released, allowing all air to escape. The hydraulic fluid causes the bladder to collapse. The lower half of the bladder being thinner than the upper half will collapse first, protruding upwardly into the upper half. When completely collapsed, the lower half will be inverted upon the upper half of the bladder as shown in dotted lines. The internal bead 27 on bladder 26 provides a radius for the bend so that the bladder material will not be too greatly stretched, an important point when the assembly is extremely cold and the rubber is brittle. The bladder also covers the bottom surface of plug 30 and the insert 44.

The insert 44 has such fine holes that as regards a material as tough as rubber, it prevents an impervious or solid wall giving complete support. The invention therefore absolutely insures that the bladder 26 will not be damaged.

Having fully described the invention, it is not intended to limit it to the description or to the drawing or otherwise limit the invention except by the terms of the following claim.

I claim:

A bladder type accumulator comprising a shell having an air opening and a hydraulic opening, a flexible partition secured within said shell separating said air opening from said hydraulic opening, and an insert of powdered metal placed in the inner end of said air opening having a porosity that permits the passage of air, but of sufficient density to present a surface that is impervious to the flow of partition material, to protect said partition from damage when air is substantially lacking on one side of said partition and hydraulic pressure is applied on the other side of said partition.

JOHN W. WHITE.